(No Model.)

A. HIRSHHEIMER & C. M. MUELLER.
MACHINE FOR JOINTING STAVES.

No. 392,432. Patented Nov. 6, 1888.

Witnesses.
Geo. B. Evans
J. B. Hartsinck

Inventors.
Albert Hirshheimer
Chas. M. Mueller.
By their Attorneys:

UNITED STATES PATENT OFFICE.

ALBERT HIRSHHEIMER AND CHARLES M. MUELLER, OF LA CROSSE, WISCONSIN.

MACHINE FOR JOINTING STAVES.

SPECIFICATION forming part of Letters Patent No. 392,432, dated November 6, 1888.

Application filed December 1, 1887. Serial No. 256,627. (No model.)

*To all whom it may concern:*

Be it known that we, ALBERT HIRSHHEIMER and CHARLES M. MUELLER, citizens of the United States, residing at La Crosse, in the county of La Crosse and State of Wisconsin, have invented certain new and useful Improvements in Machines for Jointing Staves; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to machines for jointing the staves of barrels and the like, and is of that class in which the stave is so presented to the cutting-instrument by means of a centering device that the stave is jointed upon a plane passing through the center of the barrel or keg of which it is to form a part.

The invention consists in the peculiar construction and arrangement of the adjusting devices, whereby staves of different widths may be jointed to fit together in the same cask, as well as different sizes of staves for different sizes of barrels or kegs, all as hereinafter more fully set forth and described.

This invention is adapted to be attached to any saw-table of ordinary construction or to any table upon which any kind of suitable cutter may be mounted, thereby doing away with the necessity of having a distinct machine for the purpose. It is illustrated and described as attached to a table or bench carrying an ordinary jointing-saw.

Figure 1:
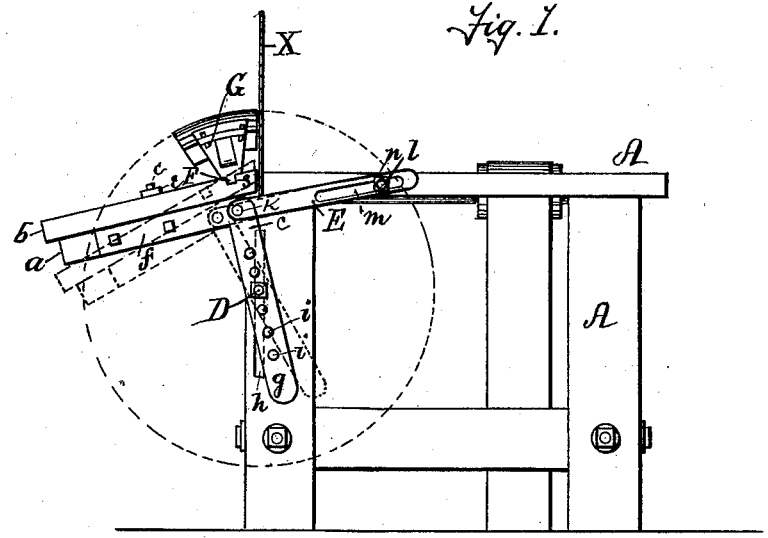
Figure 2:
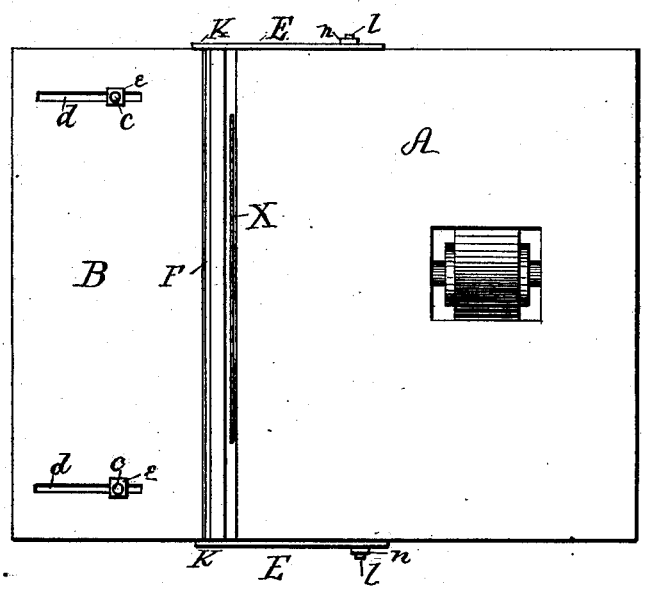

In the accompanying drawings, Figure 1 is an end elevation of a saw-table provided with our improved stave-jointing mechanism, and Fig. 2 is a top view of the same.

Like letters designate corresponding parts in both the figures.

A is a saw-table or bench of ordinary construction, the saw or cutter X being located at one side thereof. Upon the side of the table at which the saw is located is adjustably mounted a tilting table, B, composed of a suitable frame-work, $a$, to which the table-top $b$ is secured by means of bolts $c\,c$ at each end of the same, upon which the table-top is movable laterally by means of slots $d\,d$, through which the bolts $c\,c$ pass. The table-top is thus adjustable in order that the tilting table may be kept close to the saw to afford firm support for the carriage whatever may be the adjustment of the table otherwise. The bolts $c\,c$ are provided with nuts $e\,e$ or other means of tightening, in order that the table-top may be rigidly secured in any desired position.

The frame-work $a$ is adjustably attached to the saw-bench by means of an elbow-shaped arm, C, at each end thereof, one end of which, as $f$, is bolted to the frame-work of the tilting table, and the other end, $g$, is secured to the frame-work of the saw-bench by means of a pivot, D, passing through any convenient portion of the same in the same plane in which the saw is located. The same construction is used at each end of the table, and a line drawn from pivot D at one end of the table to pivot D at the other end represents the center of the barrel for which the stave is to be jointed and lies wholly in the plane of the saw. To enable the table to be adjusted for jointing staves for different sizes of kegs and barrels, the pivot D moves in a slot, $h$, in the frame-work extending in the direction of the plane of the saw, and the arm $g$ is provided with a similar slot or series of holes, $i$, for the same purpose. To adjust the table for jointing staves of larger or smaller barrels, it is only necessary to move the pivot D lower or higher in the slot and equally in the same direction in the arm $g$, supporting the adjustable table B. The distance from the pivotal line to the cutting-point is always equal to the radius of the barrel for which the stave will be jointed by that adjustment.

The pivots D D may be ordinary bolts, having head at one end and screw-thread and nut at the other, in order that they may be adjusted to and retained securely in any desired position. Instead of the slot $h$, a series of holes may be made use of, or both arm $g$ and frame-work may have either slots or holes, as desired.

To adjust the tilting table B for varying widths of staves in the same size of barrel, an arm, E, is hinged or pivoted at one end, $k$, to the frame-work $a$, or to the arm $g$, at any convenient point, and the other end is adjustably attached to the saw-bench by means of a pin or bolt, *l*, fixed in the frame-work and passing through the slot *m* in the arm E. The bolt *l* is provided with a screw-thread and nut, *n*, by means of which the arm E may be secured in any desired position. The pivotal point D being fixed, the distance to which the table B may be tilted away from the saw is adjusted by means of the slot *m* in the arm E and the bolt *l* in the frame-work. From the location of the pivotal point D it will be seen that whatever the width of the stave—the plane of the cutting-edge always passing through the pivotal point—the stave will be jointed upon a plane passing through the center of the barrel of which it is to form a part. As the table is tilted farther away from the saw by the adjustment of the arm E, the top *b* of the table is moved upon the bolts *c c* close up to the saw, and vice versa, so as at all times to furnish a proper support for the carriage upon which the stave is carried. It is designed to use this table in connection with the bending-former G described in our application for Letters Patent on machine for bending staves, of even date herewith, and for this purpose a grooved track, F, is formed near the inner edge of the tilting table parallel with the saw, into which a flange, *s*, upon the said former fits. The former G thus becomes the carriage for the jointing-machine, by which means the stave is jointed while rigidly held upon the bending-form, whereby any inaccuracy that is liable to occur from the springing of the wood on its release from the bending-form is wholly obviated. At the same time there is a great saving of time and labor, for the reason that the labor of adjusting the stave properly upon the carriage is done away with.

The jointing mechanism may be used for other purposes where a centering device is required as well as in the manufacture of staves.

We claim as our invention—

1. In combination with the saw or cutter and the frame upon which it is mounted, the pivots D D, mounted in slots in said frame-work, said slots extending in the plane of the cutting-edge, the arms C C, one end of the same being mounted upon said pivots and adjustable thereon and the other end carrying the table B, substantially as and for the purpose herein specified.

2. In combination with a saw or cutter and the frame-work upon which the same is mounted, the pivots D D, mounted in slots in said frame-work and adjustable therein in the plane of the cutting-edge, the arms C C, movably mounted on said pivots and carrying the frame-work *a*, and the table *b*, laterally adjustable upon said frame-work, substantially as and for the purpose herein specified.

3. In combination with the saw or cutter and the frame-work upon which the same is mounted, the pivots D D, located and adjustable in vertical slots in the frame-work, the arms C C, movably mounted upon said pivots and carrying the frame-work *a* and table *b* thereon, and the arms E E, pivoted to the said frame-work *a* at one end and the other end adjustably attached to the frame-work of the bench by means of slot *m*, bolt *l*, and nut *n*, substantially as described, whereby the tilting table may be adjusted to and secured in any desired position.

In testimony whereof we affix our signatures in presence of two witnesses.

ALBERT HIRSHHEIMER.
CHARLES M. MUELLER.

Witnesses:
SARA L. FOX,
HARRY MARSH.